United States Patent
Pendergrass

(10) Patent No.: US 6,949,205 B2
(45) Date of Patent: Sep. 27, 2005

(54) FLUORESCENT COMPOSITION FOR MARKING NON-POROUS OBJECTS

(76) Inventor: Paula B. Pendergrass, 37 Gilbert La., Dover, AR (US) 72837

( * ) Notice: Subject to any disclaimer, the term of this patent is extended or adjusted under 35 U.S.C. 154(b) by 232 days.

(21) Appl. No.: 10/199,210

(22) Filed: Jul. 18, 2002

(65) Prior Publication Data

US 2003/0017260 A1 Jan. 23, 2003

Related U.S. Application Data

(60) Provisional application No. 60/307,197, filed on Jul. 20, 2001.

(51) Int. Cl.[7] .............................................. C09K 11/02
(52) U.S. Cl. ............................ 252/301.36; 252/301.35; 523/160; 523/161; 524/563
(58) Field of Search ...................... 252/301.36, 301.35; 524/563; 523/160, 161

(56) References Cited

U.S. PATENT DOCUMENTS

| | | | | |
|---|---|---|---|---|
| 1,348,904 A | * | 8/1920 | Smith ...................... 106/157.8 |
| 3,490,935 A | * | 1/1970 | Danberg ...................... 428/87 |
| 3,640,889 A | * | 2/1972 | Stewart .................. 252/301.35 |
| 6,127,518 A | * | 10/2000 | Columbus et al. .......... 528/503 |

* cited by examiner

*Primary Examiner*—C. Melissa Koslow
(74) *Attorney, Agent, or Firm*—Cascio, Schmoyer & Zervas; Craig W. Schmoyer

(57) ABSTRACT

A composition for a fluorescent marking paste or paint that is non-toxic, water soluble, clear drying and safe for non-porous surfaces is disclosed. The invention is composed of a generic white school paste or any other water soluble, non-toxic, clear drying paste or cement to which non-toxic fluorescent or phosphorescent colorant particles and water are added. The consistency of the resultant mixture is either a paste for making an impression or a paint for applying to a non-porous object using a brush, and the paste or paint, when dry, is clearly visible under UV light. Unique identifying marks such as identifying stamps, actual fingerprints, or numbers may be placed on any nonporous object that can be safely cleaned with a damp cloth. This invention provides a safe marking system for allowing e-commerce sellers to prevent buyer fraud or for allowing owners to identify possessions for inventory and insurance purposes. The identifying mark may be deliberately removed by the owner without causing any harm or damage to the object.

12 Claims, 4 Drawing Sheets

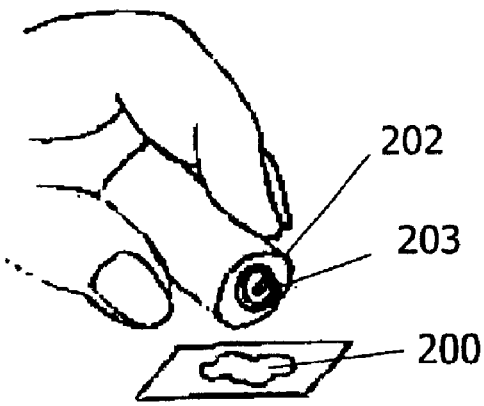
FIG. 2a
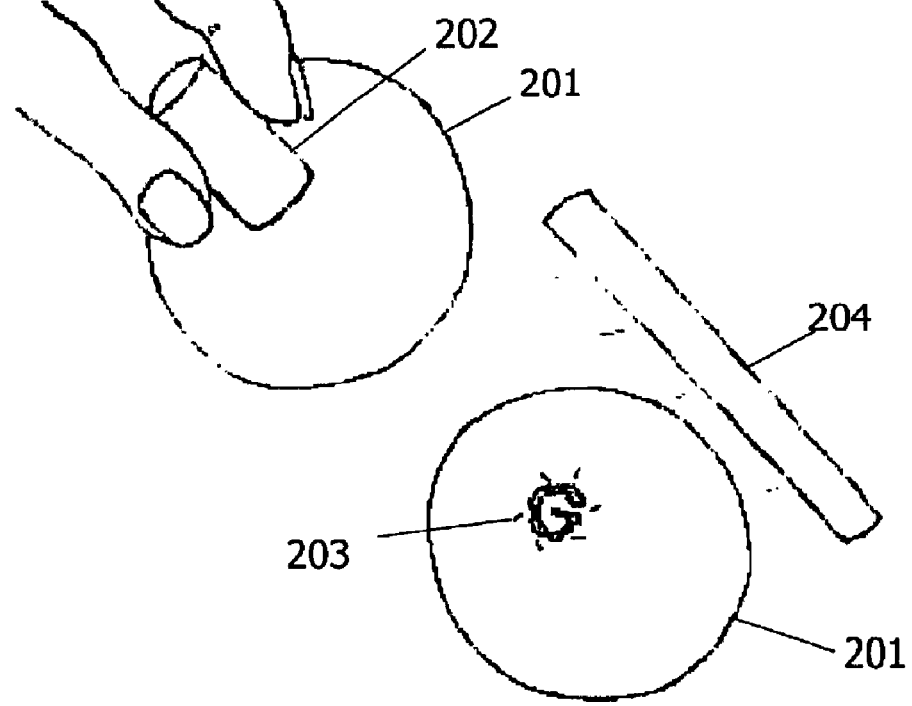
FIG. 2b
FIG. 2c

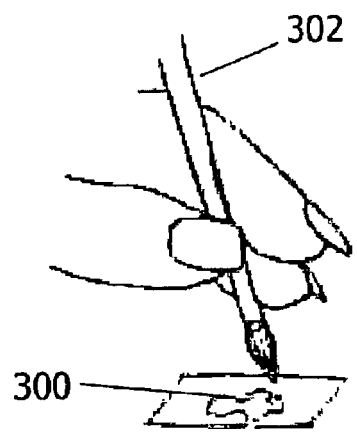
FIG. 3a
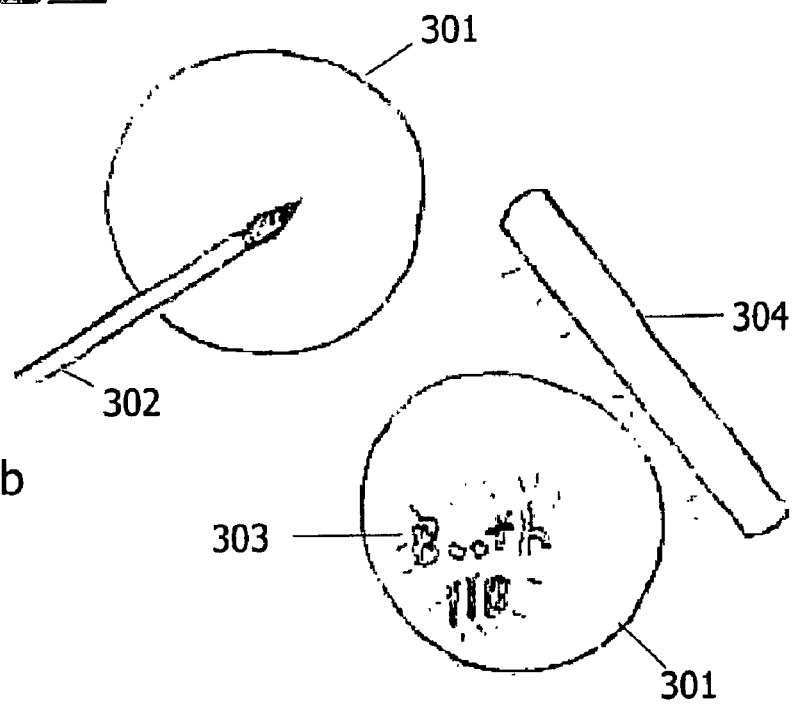
FIG. 3b
FIG. 3c

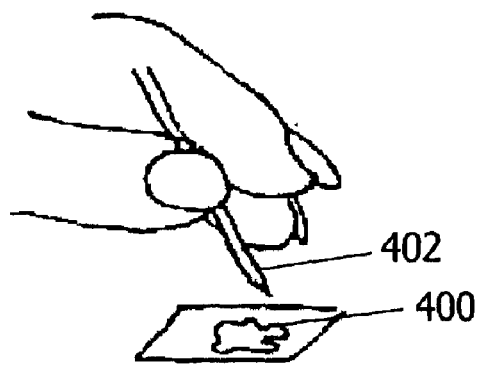
FIG. 4a
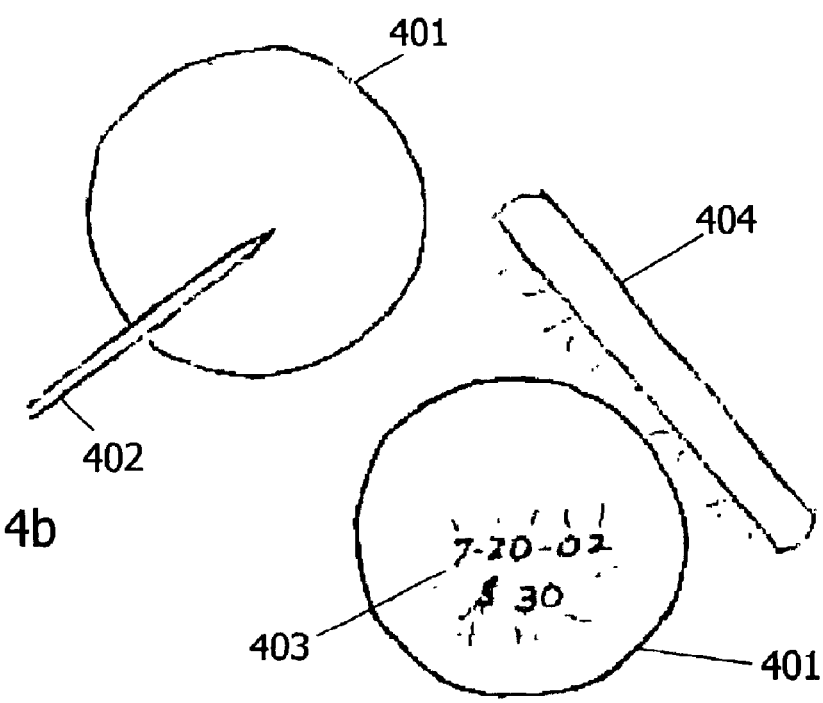
FIG. 4b
FIG. 4c

FLUORESCENT COMPOSITION FOR MARKING NON-POROUS OBJECTS

BACKGROUND OF THE INVENTION

This application claims the benefit of U.S. Provisional Application No. 60/307,197 filed Jul. 20, 2001.

1. Field of the Invention

The present invention relates to a composition and method for marking non-porous objects with fluorescent identification that is non-toxic, water soluble, clear-drying, and will not damage surfaces.

2. Description of the Related Art

A safe marking system is needed by e-commerce auction sellers to prevent fraud. Sellers are sometimes defrauded when an item that is returned by a buyer is not the same item shipped by a seller, but an inferior item. This practice is called "upgrading" and is used by unscrupulous collectors who claim that an item is defective then return a different item and demand their money back.

A safe marking system is needed such that a seller may mark an item so that if it is returned, a seller can confirm that the returned item is the item shipped by the seller. Currently the ability to mark glassware, china, porcelain, pottery, jewelry, toys, tools, painted items, and plastics, i.e., any item that can safely be cleaned with a damp cloth, is limited by the destructiveness, permanence, or unsightliness of the marking agent. Diamond pens, permanent markers, oil-based paints, etc. can permanently damage expensive items and reduce their value. Permanence is an important characteristic of any marking system. Any identification mark must be permanent until such identification is deliberately removed. Marks made on labels or tape, subsequently attached to a non-porous object, are frequently lost when the adhesive fails.

A need also exists for a safe marking system for collectors and homeowners for inventory and insurance purposes. A common method of marking is to place an identifying number on a piece of tape or on a small paper label affixed to the bottom of items. Such tapes and labels are easily dislodged by routine handling of objects. Another method used to identify non-porous items is to engrave an identifying number onto the item. Such an engraving may permanently mar or deface an object and may cause subsequent reduction in value. Further, both methods of identification are readily visible upon inspection and may be removed by someone other than the owner.

A need therefore exists for a composition and method for marking non-porous objects that will allow an e-commerce auction seller to positively identify items that are subsequently returned and further allow owners to mark items for inventory and insurance purposes.

SUMMARY OF THE INVENTION

A primary object of this invention is to provide a more efficient means of marking non-porous objects that will be non-toxic, water soluble, and nearly invisible under normal lighting conditions when dry. Another object of this invention is to provide a means to uniquely identify a non-porous object to prevent fraud and to allow identification for inventory and insurance purposes. Yet another object of this invention is to provide a means of marking non-porous objects that will not damage or mar the objects. Still yet another object of this invention is to have the markings visible when exposed to light having wavelengths outside the range of normal vision.

These and other objects of the invention, as will be apparent, are accomplished by preparing a mixture of water, a water-soluble white glue such as ELMER'S® School Glue distributed by ELMER's PRODUCTS, INC. of Columbus, Ohio, and an organic fluorescent or phosphorescent colorant. Any other generic white school paste or any other water-soluble, nontoxic, clear drying paste or cement may be used. The fluorescent or phosphorescent colorants should be non-toxic with no known hazardous ingredients, and will ideally comply with a product safety code classification of A-594-5. Dye or colorant particles will ideally be in the 1–50 micrometer range. Suitable colorants are GLO GERM™ marketed by Glo Germ Company, PO Box 537, Moab, Utah 84532 and series A-and AX-thermoplastic resin pigments marketed by DayGlo Corporation of Cleveland, Ohio. A paste is prepared by mixing 4 ounces white glue with one ounce water and 0.01–0.1 ounce of a fluorescent or phosphorescent powder. This paste is suitable for capturing and preserving a uniquely identifying personal fingerprint or stamp; the paste can be further diluted with water to be used as paint.

BRIEF DESCRIPTION OF THE DRAWINGS

The above objects and advantages of the present invention will become more apparent by describing, in detail, preferred embodiments thereof with reference to the attached drawings in which:

FIGS. 2a–2c show the application of the composition to a non-porous object using a stamp to emboss a unique design and subsequent inspection.

FIGS. 3a–3c show the application of the composition to a non-porous object using a brush to create a unique identifier and subsequent inspection.

FIGS. 4a–4c show the application of the composition to a non-porous object using a stylus to write a unique identifier and subsequent inspection.

DETAILED DESCRIPTION OF THE PREFERRED EMBODIMENTS

Preferred embodiments of the present invention will now be described with reference to the attached drawings, wherein identical elements are designated with like numerals.

In a preferred embodiment of the present invention, a mixture of water, a water soluble, non-toxic, clear drying paste or cement, and an organic fluorescent or phosphorescent colorant is prepared. A commercially available generic white school paste may be used, although any other water soluble, non-toxic, clear drying paste or cement may be used. A fluorescent or phosphorescent colorant having no known hazardous ingredients may be used. Such colorants are commercially available and include GLO GERM™ manufactured by Glo Germ Company, PO Box 537, Moab, Utah 84532 and series A-and AX-thermoplastic resin pigments manufactured by DayGlo Corporation of Cleveland, Ohio. Colorants may be selected that are responsive to light having wavelengths outside the range of normal vision.

Figure 1A:
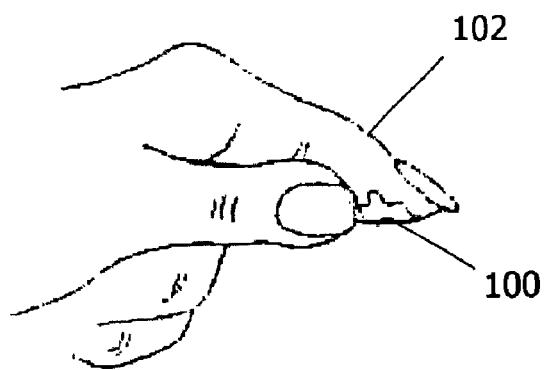
FIGS. 1a–1c show the application of the composition to a non-porous object using a finger to cause an impression of a fingerprint and subsequent inspection.
Figure 1B:
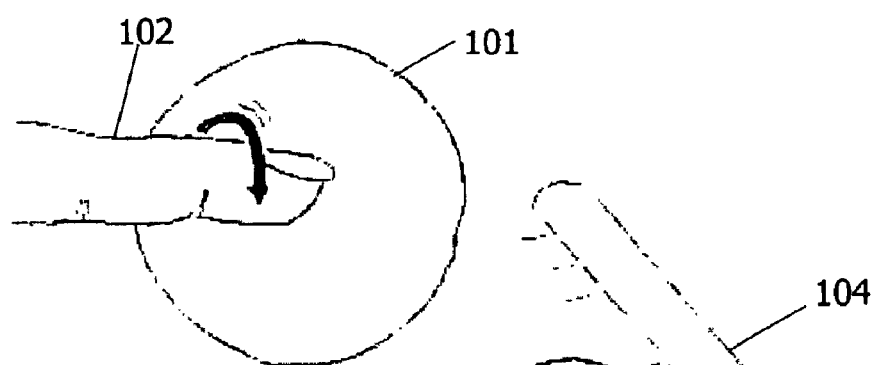
Figure 1C:
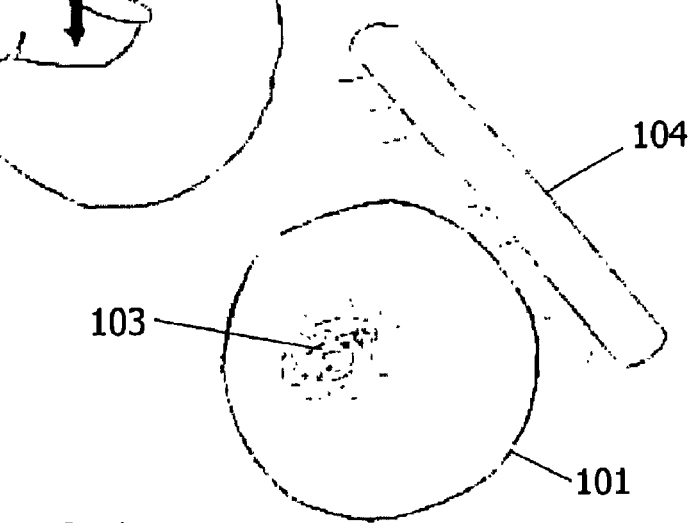

A mixture of water, paste, and colorant is prepared in a preferred ratio of about four ounces paste, one ounce water, and from 0.01 to 0.10 ounce of colorant. Referring now to FIGS. 1a–1c, the resultant mixture 100, having sufficient viscosity to retain an impression of a finger 102, is then applied to a non-porous object 101 using a finger causing a fingerprint 103. The mixture having the fingerprint 103 is then allowed to dry, and once dry, the mixture is clear and undetectable under normal lighting conditions. However, the mixture is clearly visible when illuminated by a light 104 having a wavelength causing the mixture to fluoresce thereby making the resultant fingerprint visible.

Referring to FIGS. 2a–2c, in another embodiment of the invention, a mixture of water, paste, and colorant is prepared as described above wherein the resultant mixture 200 has a viscosity sufficient to retain the image 203 of a stamp 202 when the mixture 200 is applied to a non-porous object 201. When dry, the mixture 200 is clear and the image 203 may be rendered visible when exposed to a light 204 having a wavelength that causes the mixture 200 to fluoresce.

Referring now to FIGS. 3a–3c and in yet another embodiment of the invention, a mixture is prepared in a preferred ratio of about 11 ounces water, one ounce paste, and from 0.01 to 0.10 ounce of colorant. The resultant mixture 300 has the consistency of paint and is suitable for application on a non-porous material 301 using a brush 302. Rather than impressing an image into a thin paste, a symbol or an image 303 is drawn using a brush 302. In this manner any unique symbol or design 303 selected by a user may be applied. This unique symbol or design 303 may then be inspected using a light 304 of a particular wavelength causing the fluorescent or phosphorescent colorant to become visible. Symbol 303 may be chosen by a seller to identify the owner, the item, a date of the sale, or any other information useful to identify that item. As shown in FIGS. 4a–4c, the unique symbol or design 403 by be applied to a non-porous object 401 using a stylus 402 or other suitable means for writing using the mixture 400. The unique symbol or design 403 applied using the stylus 402 may subsequently be inspected using a light source 404 having a particular wavelength causing the fluorescent or phosphorescent material to become visible. In this manner, a seller may be able to identify any returned item as being the item originally sent, or an owner may be able to identify property should subsequent identification be necessary.

The ratio of water to paste may be varied to prepare a mixture having any desired viscosity according to the requirements of a particular circumstance. The specific ratios mentioned above are exemplary and explanatory only and are not restrictive of the present invention as claimed.

What is claimed is:

1. A composition for marking non-porous materials comprising:
    water;
    water soluble white glue, wherein the water soluble white glue is nontoxic;
    colorant, wherein the colorant is nontoxic;
    and wherein the water soluble glue to water ratio is substantially 4 to 1 by weight, and wherein the colorant to water ratio is in the range of one one-hundredth to one tenth to 1 by weight.

2. A composition as in claim 1, wherein the colorant is responsive to light having wavelengths outside the range of normal vision.

3. A composition as in claim 2, wherein the colorant is an organic fluorescent.

4. A composition as in claim 2, wherein the colorant is an organic phosphorescent.

5. A composition as in claim 1, wherein the colorant is in the form of particles having a size in the 1 to 50 nanometer range.

6. A composition as in claim 1, wherein the composition is clear when dry.

7. A composition for marking non-porous materials comprising:
    water;
    water soluble white glue, wherein the water soluble white glue is nontoxic;
    colorant, wherein the colorant is nontoxic;
    and wherein the water to water soluble glue ratio is substantially 11 to 1 by weight, and wherein the colorant to paste ratio is in the range of one one-hundredth to one tenth to 1 by weight.

8. A composition as in claim 7, wherein the colorant is responsive to light having wavelengths outside the range of normal vision.

9. A composition as in claim 8, wherein the colorant is an organic fluorescent.

10. A composition as in claim 8, wherein the colorant is an organic phosphorescent.

11. A composition as in claim 7, wherein the colorant is in the form of particles having a size in the 1 to 50 nanometer range.

12. A composition as in claim 7, wherein the composition is clear when dry.

* * * * *